US012192237B2

(12) United States Patent
Penner et al.

(10) Patent No.: US 12,192,237 B2
(45) Date of Patent: *Jan. 7, 2025

(54) DETECTING ATTACKS USING HANDSHAKE REQUESTS SYSTEMS AND METHODS

(71) Applicant: Citrix Systems, Inc., Fort Lauderdale, FL (US)

(72) Inventors: Andrew Penner, Savoy, IL (US); Tushar Kanekar, Fremont, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/236,233

(22) Filed: Apr. 21, 2021

(65) Prior Publication Data

US 2021/0243227 A1    Aug. 5, 2021

Related U.S. Application Data

(63) Continuation of application No. 16/207,423, filed on Dec. 3, 2018, now Pat. No. 11,019,100.

(51) Int. Cl.
*H04L 9/40* (2022.01)
*H04L 67/63* (2022.01)

(52) U.S. Cl.
CPC ........ *H04L 63/166* (2013.01); *H04L 63/0428* (2013.01); *H04L 63/126* (2013.01);
(Continued)

(58) Field of Classification Search
CPC ... H04L 63/166; H04L 67/63; H04L 63/0428; H04L 63/126; H04L 63/1416; H04L 63/1441; H04L 9/40
See application file for complete search history.

(56) References Cited

U.S. PATENT DOCUMENTS 5,850,446 A * 12/1998 Berger ................ H04L 12/5692
713/153
7,484,011 B1 * 1/2009 Agasaveeran .......... H04L 67/02
709/250
(Continued)

FOREIGN PATENT DOCUMENTS

CN    107438074 A    12/2017
CN    108429761 A    8/2018

OTHER PUBLICATIONS

Morello et al. Know Your Firewall: Layer 3 vs. Layer 7, https://securityboulevard.com/2018/10/know-your-firewall-layer-3-vs-layer-7/, Oct. 3, 2018 (Year: 2018).*
(Continued)

*Primary Examiner* — Robert B Leung
*Assistant Examiner* — Howard H. Louie

(57) ABSTRACT

Systems and methods for detecting attacks using a handshake request are provided. A plurality of devices can receive a plurality of handshake requests to establish TLS connections that include a respective application request. At least one of the plurality of handshake requests can include a first application request. The plurality of devices can record each of the respective application requests to a registry of application requests. A first device of the plurality of devices can receive a subsequent handshake request to establish a subsequent TLS connection that includes the first application request. The first device can query, prior to accepting the first application request, the registry for the first application request. The first device can determine whether to accept or reject the first application request responsive to identifying from the query that the first application request has not been or has been recorded in the registry.

11 Claims, 9 Drawing Sheets

(52) U.S. Cl.
CPC ...... *H04L 63/1416* (2013.01); *H04L 63/1441* (2013.01); *H04L 67/63* (2022.05)

(56) References Cited

U.S. PATENT DOCUMENTS

| | | | |
|---|---|---|---|
| 2003/0159029 A1* | 8/2003 | Brown | H04L 67/02 |
| | | | 713/151 |
| 2004/0054924 A1 | 3/2004 | Chuah et al. | |
| 2007/0121596 A1 | 5/2007 | Kurapati et al. | |
| 2007/0268915 A1 | 11/2007 | Zelig et al. | |
| 2010/0146291 A1* | 6/2010 | Anbuselvan | H04L 63/123 |
| | | | 707/E17.014 |
| 2013/0297814 A1 | 11/2013 | Annamalaisami et al. | |
| 2014/0006781 A1* | 1/2014 | Corella | H04L 9/3213 |
| | | | 713/168 |
| 2015/0033335 A1 | 1/2015 | Zhao et al. | |
| 2016/0134616 A1* | 5/2016 | Koushik | G06F 21/335 |
| | | | 726/9 |
| 2016/0183085 A1* | 6/2016 | Yerrabommanahalli | |
| | | | H04L 63/107 |
| | | | 713/153 |
| 2016/0239683 A1 | 8/2016 | Gujral et al. | |
| 2017/0154091 A1* | 6/2017 | Vig | G06F 16/90 |
| 2018/0183603 A1 | 6/2018 | Liu et al. | |

OTHER PUBLICATIONS

Rescorla et al., The Transport Layer Security (TLS) Protocol Version 1.3 Jul. 3, 2017 (Year: 2017).*
Nekritz et al. https://engineering.fb.com/2017/01/27/android/building-zero-protocol-for-fast-secure-mobile-connections/, Jan. 27, 2017 (Year: 2017).*
International Preliminary Report on Patentability on International Appl. No. PCT/US2019/063731 mailed Jun. 17, 2021.
Examination Report on CA Appl. 3121481 dated Jun. 28, 2021.
International Search Report and Written Opinion on International Appl. No. PCT/US2019/063731 mailed Feb. 13, 2020.
Non-Final Office Action on U.S. Appl. No. 16/207,423 dated Aug. 3, 2020.
Notice of Allowance on U.S. Appl. No. 16/207,423 dated Jan. 29, 2021.

* cited by examiner

DETECTING ATTACKS USING HANDSHAKE REQUESTS SYSTEMS AND METHODS

CROSS-REFERENCE TO RELATED APPLICATION

This application is a continuation of and claims priority to and the benefit of U.S. patent application Ser. No. 16/207,423, titled "DETECTING ATTACKS USING HANDSHAKE REQUESTS SYSTEMS AND METHODS," and filed on Dec. 3, 2018, the contents of all of which are hereby incorporated herein by reference in its entirety for all purposes.

BACKGROUND

In many server deployments, users transmit sensitive or encrypted data over a network to a server. The transmission can be maliciously or fraudulently repeated or delayed in the form of a replay attack. For example, two or more identical copies of a request may be processed if the requests arrive at different servers. Thus, in many server deployments, it can become increasingly difficult to determine which client requests have been seen before. Many server protocols may not provide sufficient protection against a network attacker who makes a copy of the client request and replays it to the server at a later time.

SUMMARY

Systems and methods for detecting attacks using a handshake request is provided herein. A group or plurality of devices, such as but not limited to transport layer security (TLS) servers, can detect and prevent replay attacks mounted against a plurality of servers (e.g., application servers) in a network. In embodiments, the plurality of devices can be disposed in a network between a plurality of client devices and a plurality of application servers. The devices can maintain a registry containing a record of requests received at one or more of the plurality of devices. The requests can correspond to handshake requests that include an application request, a TLS connection request or both an application request and a TLS connection request. Thus, the devices can process requests for an application and a TLS connection at a same time. In some embodiments, the devices can maintain the registry in a distributed manner across multiple devices such that each of the devices maintain a share or portion of the registry. The different portions or registry subsets can be similar or substantially similar in size.

The plurality of devices can share ownership of recording and maintaining records of received requests. For example, the devices can communicate with each other to determine which device in the plurality of devices is or will be the responsible owner device for recording a request when the respective request is received. The device receiving the request can identify the owner device and query the owner device to determine whether or not the request has been seen before. Thus, the plurality of devices can detect and prevent attacks by querying a registry or registry subsets maintained at each of the different devices to determine if a new request has been previously recorded in the registry prior to processing or accepting the new request.

The systems and methods described herein can provide protection against replay attacks even when replay attacks are mounted against disparate cores in a multi-core system or disparate systems in a multi-system deployment (cluster). Each of the devices can be configured to act independently, yet the coordination of independent devices using the systems and methods provides comprehensive replay detection. For example, the devices can communicate with each other through node-to-node messaging or core-to-core messaging to identify and determine if a request has been previously received and recorded. Thus, the systems and methods described herein can be scaled to a larger group of devices as each device in the plurality of devices shares a portion or subset of a registry. The devices can execute the same mapping function such that a request can arrive at or be received by any of the devices and each device can agree on which device is or will be the owner device to record the respective request in a registry subset maintained at the respective owner device.

In a first aspect, a method for detecting attacks using a handshake request having an application request is provided. The method can include receiving, by a plurality of devices, a plurality of handshake requests to establish a respective transport layer security (TLS) connection that include a respective application request. At least one of the plurality of handshake requests can include a first application request. The method can include recording, by the plurality of devices, each of the respective application requests to a registry of application requests. The method can include receiving, by a first device of the plurality of devices, a subsequent handshake request to establish a subsequent TLS connection that includes the first application request. The method can include querying, by the first device prior to accepting the first application request, the registry for the first application request. The method can include determining, by the first device, to reject the first application request responsive to identifying from the query that the first application request has been recorded in the registry.

In some embodiments, the method can include dropping the application request by the first device responsive to the determination but accepting a TLS connection request included in the subsequent handshake request. The method can include establishing the respective TLS connection of each of the plurality of handshakes requests by one or more of the plurality of devices. The plurality of devices can be intermediary to a plurality of clients and a plurality of servers.

The method can include selecting, using a mapping function, for each of the plurality of handshake requests a device from the plurality of devices for storing the respective application request to the registry. Each of the plurality of devices can store a portion of the registry. In some embodiments, the method can include determining, by the first device, which of the plurality of devices is to store the first application request in the registry. The method can include maintaining the recordation of the first application request in the registry until an expiration period.

In some embodiments, the method can include receiving, by a second device of the plurality of devices, a second subsequent handshake request to establish a second subsequent TLS connection that includes a second application request and querying, by the second device prior to accepting the second application request, the registry for the second application request. The method can include determining, by the second device, to accept the second application request responsive to identifying from the query that the second application request has not been recorded in the registry, and accepting a TLS connection request included in the second subsequent handshake request.

In another aspect, a system for detecting attacks using a handshake request having an application request is provided.

The system can include a plurality of devices configured to receive a plurality of handshake requests to establish a respective transport layer security (TLS) connection that include a respective application request. At least one of the plurality of handshake requests can include a first application request. One or more of the plurality of devices can be configured to record each of the respective application requests to a registry of application requests. A first device of the plurality of devices can be configured to receive a subsequent handshake request to establish a subsequent TLS connection that includes the first application request. The first device can query prior to accepting the first application request, the registry for the first application request. The first device can determine to reject the first application request responsive to identifying from the query that the first application request has been recorded in the registry.

In some embodiments, the first device can drop the first application request responsive to the determination but accept a TLS connection request included in the subsequent handshake request. The respective TLS connection of each of the plurality of handshakes can be established by one or more of the plurality of devices. The plurality of devices can be intermediary to a plurality of clients and a plurality of servers.

In some embodiments, a device from the plurality of devices can be selected, using a mapping function, for storing to the registry the respective application request for each of the plurality of handshake requests. Each of the plurality of devices stores a portion of the registry. The first device can be further configured to determine which of the plurality of devices is to store the first application request in the registry. The recordation of the first application request can be maintained in the registry until an expiration period.

In some embodiments, a second device of the plurality of devices can be configured to receive a second handshake request to establish a second subsequent TLS connection that includes a second application request and query, prior to accepting the second application request, the registry for the second application request. The second device can be further configured to accept the second application request responsive to identifying from the query that the second application request has not been recorded in the registry, and accept a TLS connection request included in the second subsequent handshake request.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for detecting attacks using a handshake request having an application request.

A. Network and Computing Environment

Figure 1A:
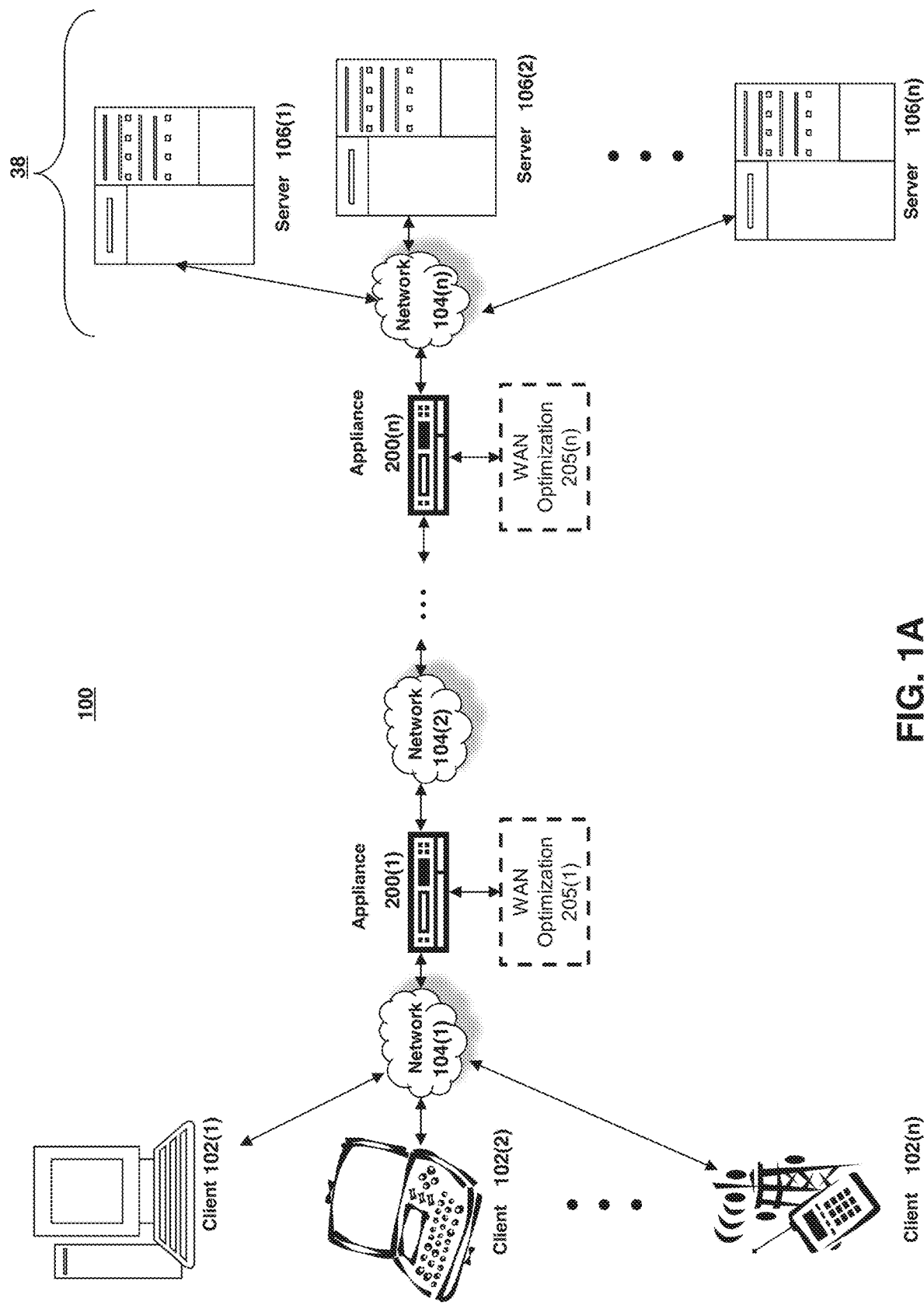
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
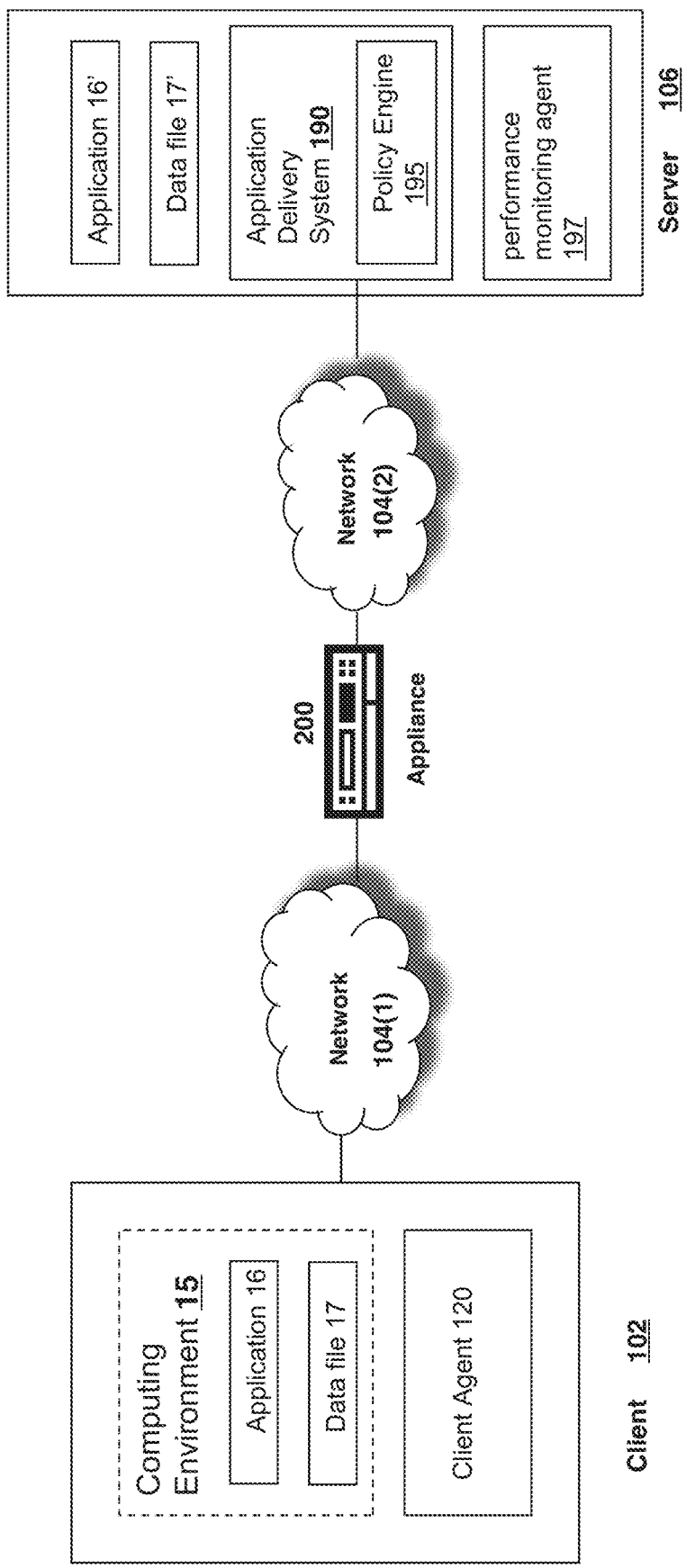
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 50 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 50), servers 106 (e.g., agent 197) or an appliance 200 and/or 205 (agent not shown). In general, monitoring agents (e.g., 50 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, FL.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
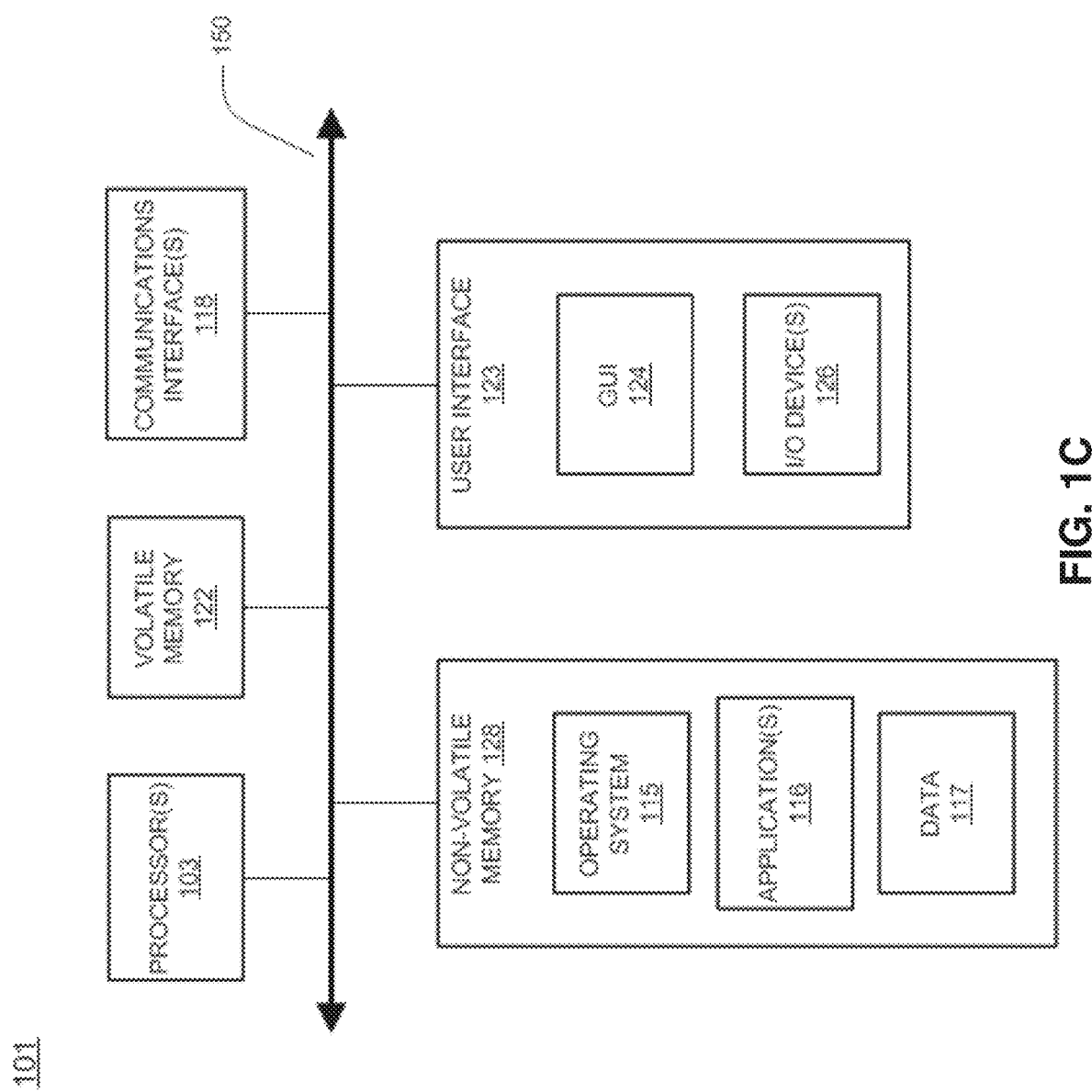
FIG. 1C is a block diagram of a computing device, in accordance with an illustrative embodiment.

As shown in FIG. 1C, computer 101 may include one or more processors 103, volatile memory 52 (e.g., RAM), non-volatile memory 58 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 53, one or more communications interfaces 118, and communication bus 150. User interface 53 may include graphical user interface (GUI) 54 (e.g., a touchscreen, a display, etc.) and one or more input/output (I/O) devices 56 (e.g., a mouse, a keyboard, etc.). Non-volatile memory 58 stores operating system 115, one or more applications 116, and data 117 such that, for example, computer instructions of operating system 115 and/or applications 116 are executed by processor(s) 103 out of volatile memory 52. Data may be entered using an input device of GUI 54 or received from I/O device(s) 56. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

Figure 2:
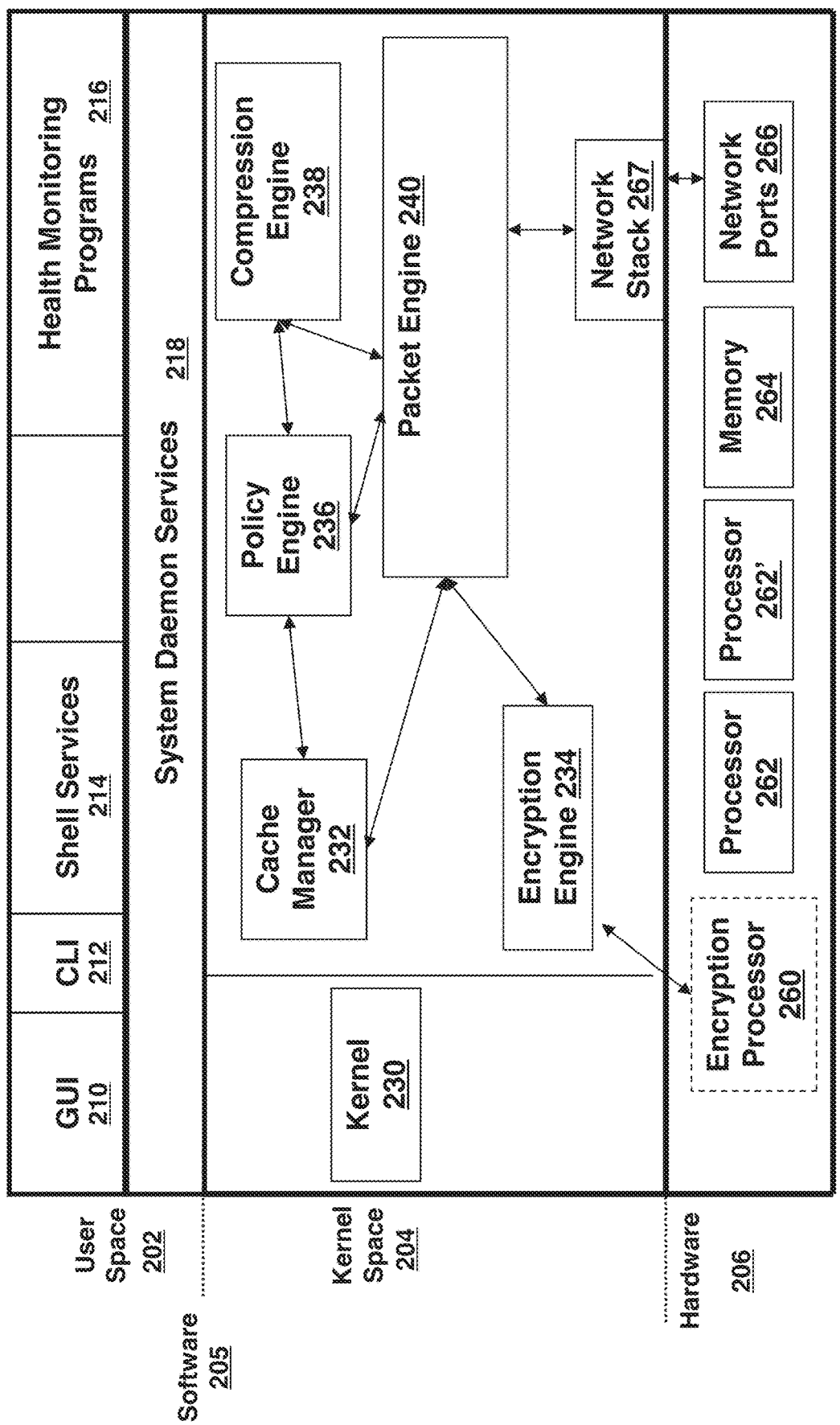
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 runs in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 50 for establishing and exchanging communications with appliance 200 and/or server 106 via a network 104. Client 102 may have installed and/or execute one or more applications that are in communication with network 104. Client agent 50 may intercept network communications from a network stack used by the one or more applications. For example, client agent 50 may intercept a network communication at any point in a network stack and redirect the network communication to a destination desired, managed or controlled by client agent 50, for example to intercept and redirect a transport layer connection to an IP address and port controlled or managed by client agent 50. Thus, client agent 50 may transparently intercept any protocol layer below the transport layer, such as the network layer, and any protocol layer above the transport layer, such as the session, presentation or application layers. Client agent 50 can interface with the transport layer to secure, optimize, accelerate, route or load-balance any communications provided via any protocol carried by the transport layer.

In some embodiments, client agent 50 is implemented as an Independent Computing Architecture (ICA) client developed by Citrix Systems, Inc. of Fort Lauderdale, Fla. Client agent 50 may perform acceleration, streaming, monitoring, and/or other operations. For example, client agent 50 may accelerate streaming an application from a server 106 to a client 102. Client agent 50 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 50 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

Figure 3:
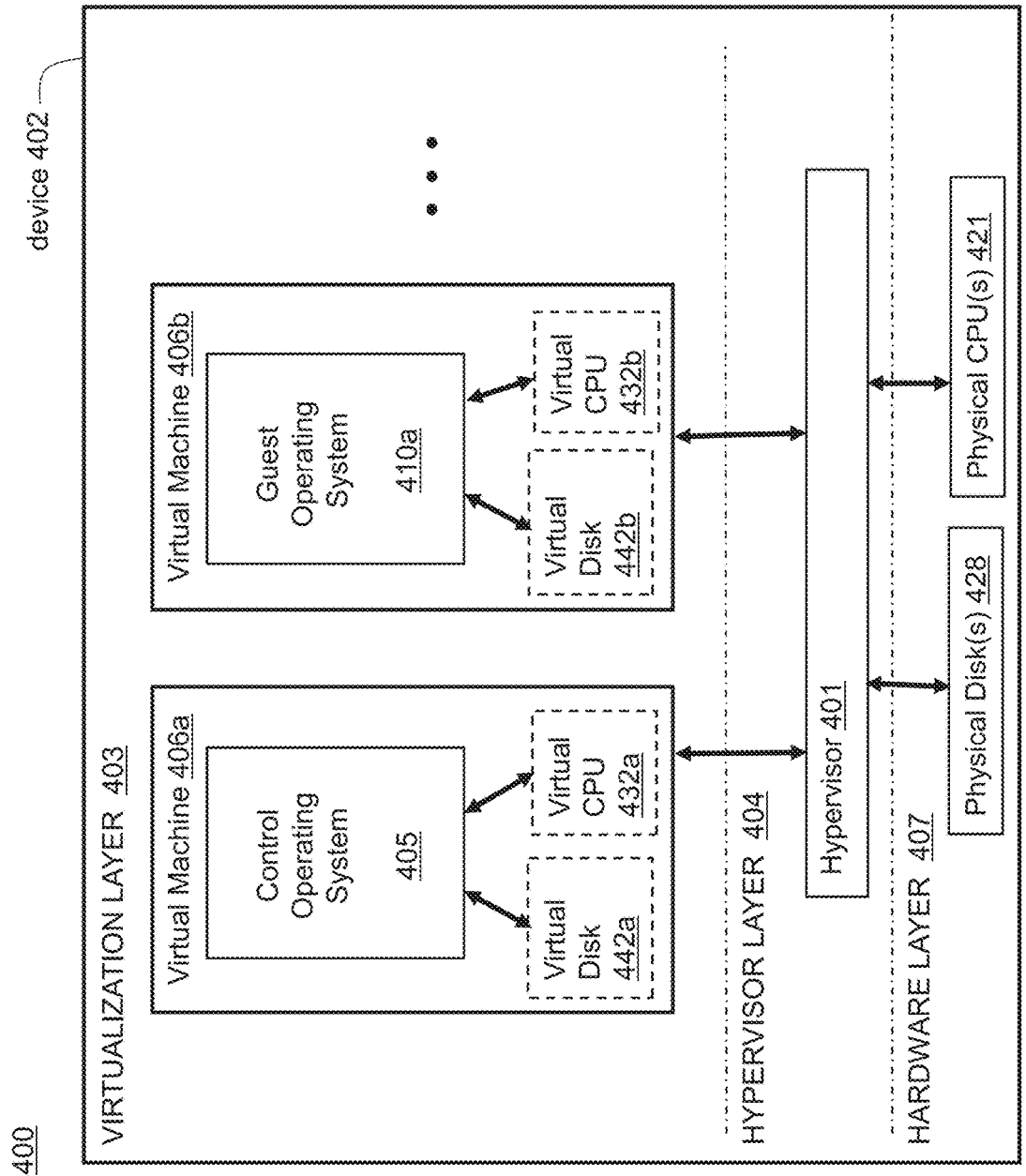
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/ or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

Figure 4:
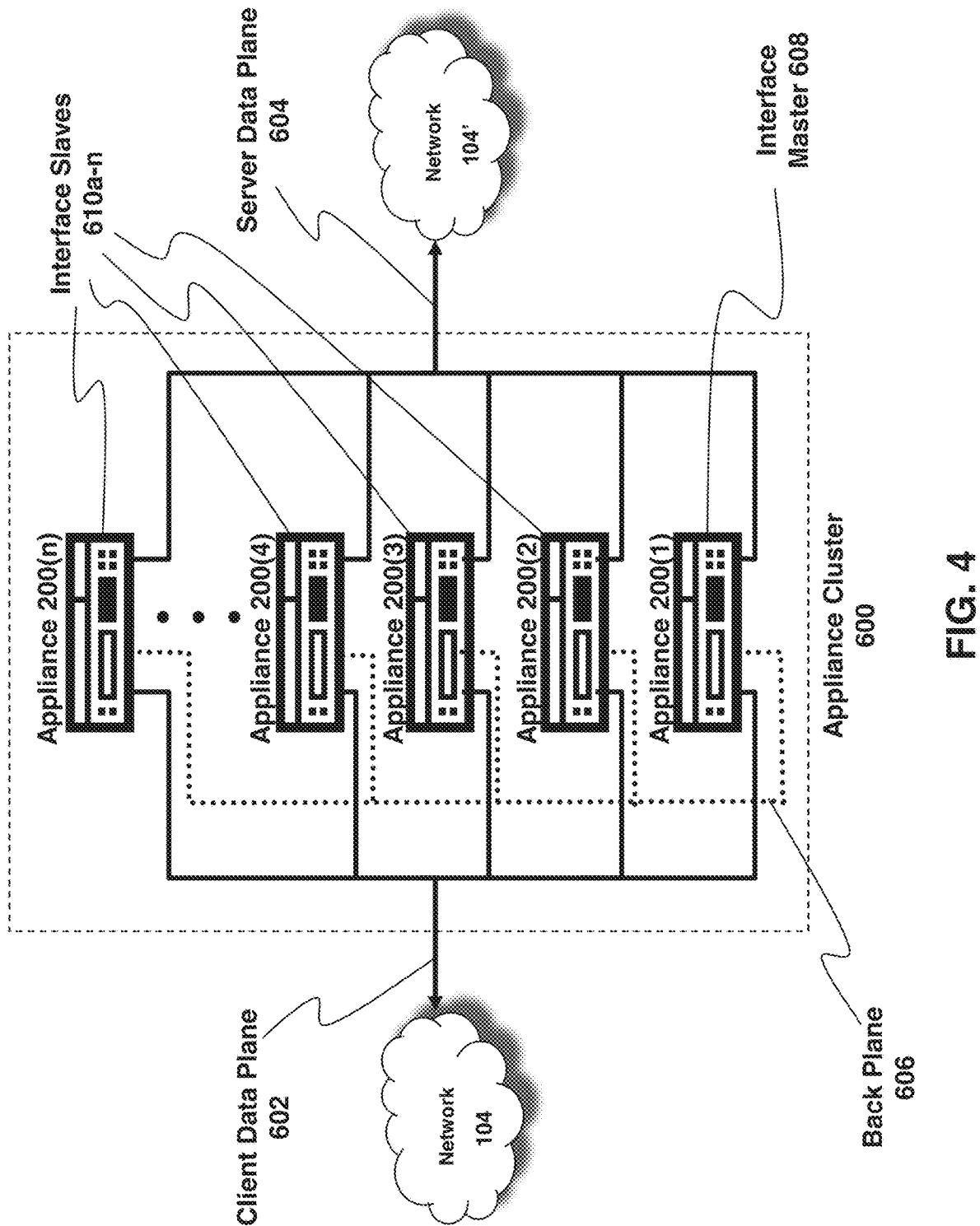
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly, to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

B. Detecting Attacks Using Handshake Requests

The systems and methods described herein can detect attacks, such as but not limited to replay attacks, using handshake requests. The plurality of devices (e.g., transport layer security servers) can be disposed in a network between a plurality of client devices and a plurality of application servers. The devices can maintain a registry containing a record of each request received within a predetermined time period or before an expiration period. The devices can use the registry to detect and prevent attacks containing copied or replayed client data. For example, the devices can maintain and update the registry when a request or subsequent request is received and processed. The devices can detect and prevent attacks by querying the registry to determine if a new request has been previously recorded in the registry prior to processing or accepting the new request. In some embodiments, the devices can maintain the registry in a distributed manner across multiple devices such that each of the devices stores a share or portion of the registry. For example, in some embodiments, when a request arrives at a first device, the first device can use a mapping function to determine which device in the group of devices is or will be the responsible owner device for recording the respective request. The first device can query the responsible owner device to determine whether or not the request has been seen before or previously recorded.

In some embodiments, the devices can execute the same mapping function or mapping algorithm for determining an owner device amongst the plurality of devices. For example, each of the devices can execute the same mapping function such that a request can arrive at or be received by any of the devices and each device can agree on which device is or will be the owner device to record the respective request in a registry subset maintained at the respective owner device. In some embodiments, the mapping function can include a consistent hashing technique over a set of nodes corresponding to the plurality of devices to identify the next owner device for a request. The request can query or otherwise check to determine if a request has been previously recorded can be performed using the core-to-core and node-to-node messaging between the plurality of devices.

In some embodiments, an incoming or subsequent request from a client device can be routed to at least one device (e.g., TLS server) of a plurality of devices. The device receiving the request can execute a mapping function to determine which device is the owner device for the request and thus, responsible for recording the respective request. In an embodiment, the mapping function can be configured to distribute the requests equally or substantially equally across the plurality of devices such that an equal share or substantially equal share of requests can be mapped and/or recorded at a registry subset at each of the devices. The receiving device can query the owner device to determine if the request has been seen before or recorded previously. The owner device can examine the registry subset maintained at the owner device and respond back to the receiving device indicating whether the request is present in the respective registry subset or not. If the request is not present in the respective registry subset, the owner device can store or record the request in its registry subset. The receiving device can process or otherwise accept the request. Processing the request can include establishing an application connection to at least one application hosted by at least one application server. If the request is present in the respective registry subset, the owner device can leave the request in the respective registry subset. The receiving device can reject the request.

Figure 5:
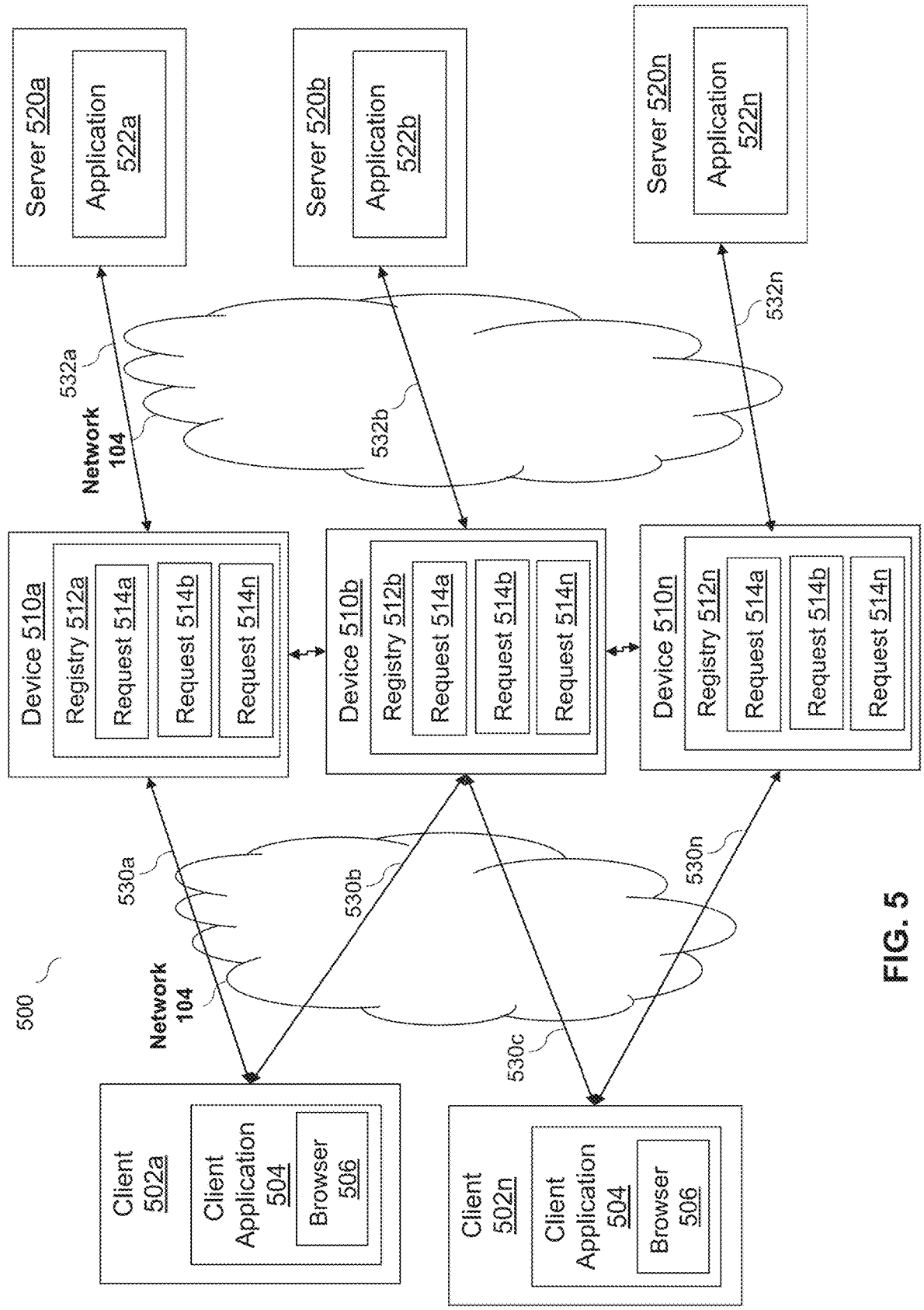
FIG. 5 is a block diagram of a system for detecting attacks using a handshake request having an application request.

Referring to FIG. 5, depicted is a block diagram of a system 500 for detecting attacks using handshake requests. As depicted in FIG. 5, a plurality of client devices 502a-502n can interact with a plurality of devices 510a-510n to process requests for one or more applications 522a-522n hosted by one or more application servers 520a-520n. For example, requests (e.g., handshake requests) from the client devices 502a-502n can be received at the plurality of devices 510a-510n. The plurality of devices 510a-510n can process the requests to detect and prevent replay attacks mounted against the client devices 502a-502n and/or the plurality of application servers 520a-520n.

The client devices 502a-502n can be an instance of any client device described herein. For example, the client devices 502a-502n can be the same as or substantially similar to at least one of clients 102(1)-102n of FIG. 1A or client 102 of FIG. 1B. The client devices 502a-502n can include a client application 504 executing thereon. The client application 504 can include or provide a browser 506 for the client devices 502a-502n to interact with applications 522a-522n hosted by the application servers 520a-520n. The client application 504 may be an instance of any client application or appliance described herein. The client application 504 can include or be provided a device (e.g., intermediary device) or appliance. For example, the client application 504 can be the same as, substantially similar to, or be provided by appliances 200(1)-200(n) of FIG. 1A and appliance 200 of FIGS. 1B-2. The client application 504 with the browser (e.g., embedded browser (CEB)) can include a CEB. The browser 506 can include elements and functionalities of a web browser application or engine. The browser 506 can locally render one or more of application 522a-522n as a component or extension of the client application 504. For example, the browser 506 can render a SaaS/Web application inside the CEB which can provide the CEB with full visibility and control of at least one application session 530a-530n.

The devices 510a-510n can include intermediary devices that are disposed within a network 104 intermediary to a plurality of clients 502a-502n and a plurality of applications servers 520a-520n. The devices 510a-510n can include servers, third party servers or transport layer security (TLS) servers. For example, the devices 510a-510n include TLS servers that provide or implement TLS protocol for communications security over network 104 (e.g., network 104 of FIG. 1A) between the plurality of clients 502a-502n and the plurality of applications servers 520a-520n. The devices 510a-510n can be the same as or substantially similar to servers 106(1)-106n of FIG. 1A and server 106 of FIG. 1B. For example, the devices 510a-510n may include an application delivery system for delivering a computing environment, application, and/or data files to client devices 502a-502n.

In embodiments, the devices 510a-510n can establish an application connection 532a-532n between at least one of the client devices 502a-502n and at least one of the application servers 520a-520n. The devices 510a-510n can establish a TLS connection 530a-530n between a client device 502 and at least one of the devices 510a-510n. The connections 530a-530n, 532a-532n (e.g., TLS connections, application connections, application sessions) can include encrypted connections or secure connections established between a client device and a device and/or application server. For example, the connections 530a-530n, 532a-532n can include encrypted and/or secure sessions established between an application and a client device and/or between a device and a client device. The connections 530a-530n, 532a-532n can include encrypted data or traffic transmitted between at least one application and a client device and/or at least one device and a client device.

The devices 510a-510n can maintain a registry 512 or a portion of a registry 512a-512n (referred to herein as a registry subset). For example, the devices 510a-510n can maintain a registry subset 512a-512n containing a record of one or more requests 514a-514n. In some embodiments, the registry 512 or registry subsets 512a-512n can contain a record of each request 514 received within a predetermined time period or within an expiration period. In some embodiments, the registry 512 or registry subsets 512a-512n can maintain or keep a record of each request 514 received for a predetermined time period or for an expiration period. The devices 510a-510n can update their respective registry subset 512 maintained at the respective device 510 when a request 514 is processed, accepted, and/or recorded. In some embodiments, the devices 510a-510n can communicate with each other to update a registry subset 512 maintained by at least one device 510 when a request 514 is processed, accepted, and/or recorded. Thus, before any request 514 or subsequent request 514 is processed, the registry 512 or a registry subset 512 can be queried to determine if the request 514 has been previously recorded in the registry 512 or a registry subset 512.

The registry subsets 512a-512n can correspond to a distributed or partitioned registry 512 that has been partitioned across multiple devices 510a-501n. For example, each of the devices 510a-510n can maintain at least one registry subset 512 of a plurality of registry subsets 512a-512n that in combination form a single registry 512 for recording requests 514a-514n. In some embodiments, each of the registry subsets 512a-512n can be the same size. In some embodiments, one or more registry subsets 512a-512n can be a different size from one or more other registry subsets 512a-512n maintained at the plurality of devices 510a-510n. In some embodiments, the devices 510a-510n can maintain a registry subset 512 containing a record of each request 514 received at the respective device 510. In some embodiments, the devices 510a-510n can maintain a registry subset 514 containing a record of each request 514 that the respective device 510 owns. The registry 514 or registry subsets 514a-514n can include a fixed-size data structure (e.g., a counting Bloom filter) or a dynamically sized data structure. In some embodiments, the memory requirements or size of the respective registry of the devices 510a-510n and/or each of the registries 512a-512n can fixed and selected such that they do not need to increase even in response to high request rates, which makes the systems and methods described herein resilient against particular attacks, such as but not limited to, distributed denial-of-service (DDoS) attacks.

The registries 512a-512n can include a plurality of requests 514a-514n. The requests 514a-514n can include multiple requests for different devices or applications. The requests 514a-514n can correspond to handshake requests transmitted between the client devices 502a-502n and the plurality of devices 510a-510n. The requests 514a-514n can include a TLS connection request and an application request. The requests 514a-514n can include a first request to establish a TLS connection with at least one device 510 of the plurality of devices 510a-510n. The requests 514a-514n can include a second request or first application request to establish a connection to at least one application server 520 of the plurality of application servers 520a-520n. The requests 514a-514n can identify at least one device 510 of the plurality of devices 510a-501n to establish a TLS connection 530 with the client device 502. In some embodiments, the requests 514a-514n can identify the device that the request is transmitted to or the device that receives the request. The request can identify at least one application server of the plurality of application servers to establish an application connection with the client device. In some embodiments, the request can identify at least one application hosted or provided by at least one application server of the plurality of application servers.

The application servers 520a-520n can be the same as or substantially similar to servers 106(1)-106n of FIG. 1A and server 106 of FIG. 1B. For example, the 520a-520n may include an application delivery system for delivering a computing environment, application 522a-522n, and/or data files to client devices 502a-502n. The servers 520a-520n can include remote severs or third party servers that host one or more applications 522a-522n.

The applications 522a-522n may include network applications 1130a-1130n that are served from and/or hosted on one or more servers, here application servers 520a-520n. The applications 522a-522n can include an application hosted on at least one server 520 accessed by at least one client device 502 via a network 104. The applications 522a-522n can include, but not limited to, a web application, a desktop application, remote-hosted application, a virtual application, a software as a service (SaaS) application, a mobile application, an HDX application, a local application, a native application (e.g., native to the client device), and/or a device couple with one or more of the client devices 502a-502n.

Network 104 may be a public network, such as a wide area network (WAN) or the Internet. In some embodiments, network 104 may be a private network such as a local area network (LAN) or a company Intranet. Network 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

The connections 530a-530n, 532a-532n can include any type or form of a session as described herein. For example, connections 530a-530n, 532a-532n may include, but not limited to, an application session, an execution session, a desktop session, a hosted desktop session, a terminal services session, a browser session, a remote desktop session, a URL session and a remote application session. The TLS connections 530a-530n may include encrypted and/or secure sessions established between at least one device 510 and at least one client 502. The application connections 532a-532n may include encrypted and/or secure sessions established between an application 522a-522n and at least one client device 502.

Each of the above-mentioned elements or entities is implemented in hardware, or a combination of hardware and software, in one or more embodiments. Each component of the client application 504 may be implemented using hardware or a combination of hardware or software detailed above in connection with FIGS. 1A-4. For instance, each of these elements or entities can include any application, program, library, script, task, service, process or any type and form of executable instructions executing on hardware of a client device (e.g., the client device 502). The hardware includes circuitry such as one or more processors in one or more embodiments.

Figure 6A:
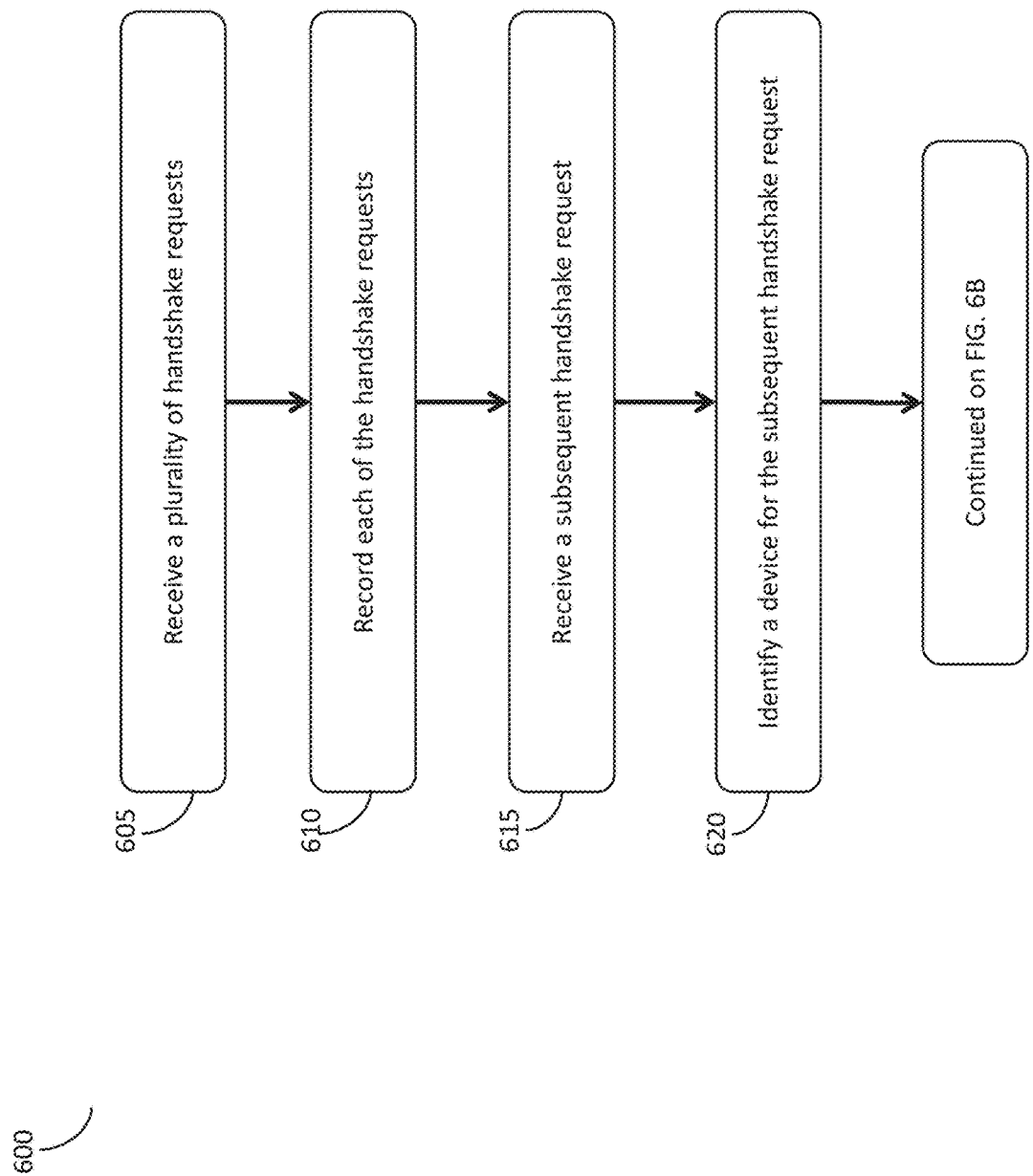
FIGS. 6A-6B are a flow diagram of a method for detecting attacks using a handshake request having an application request.
Figure 6B:
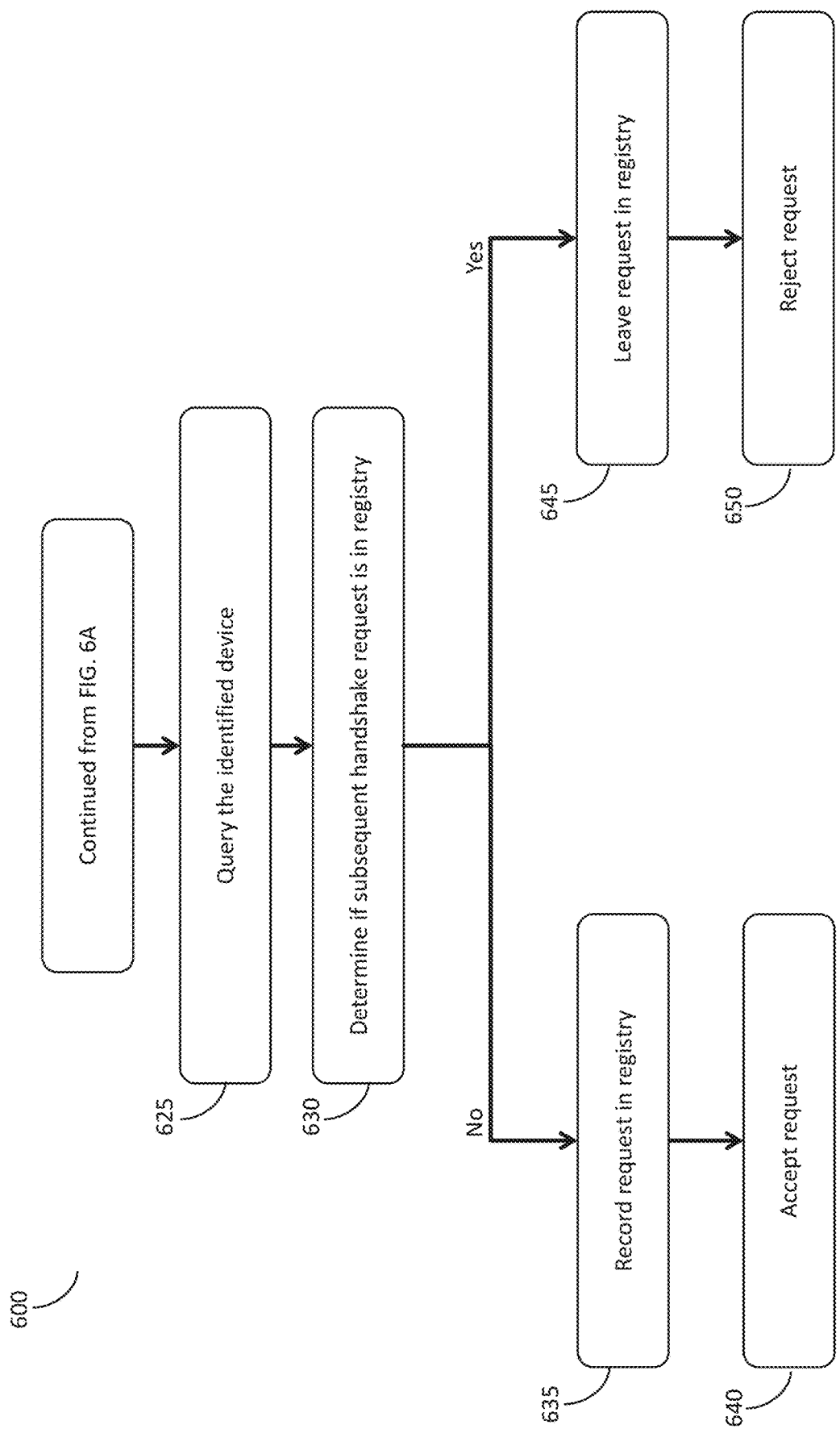

Referring now to FIGS. 6A-6B, depicted is a flow diagram of one embodiment of a method 600 for detecting attacks using a handshake request comprising an application request. The functionalities of the method 600 may be implemented using, or performed by, the components detailed herein in connection with FIGS. 1-5. In brief overview, a plurality of handshake requests can be received (605). Each of the plurality of handshake requests can be recorded (610). A subsequent handshake request can be received (615). A device to handle the subsequent handshake request can be identified (620). The identified device can be queried (625). A determination can be made if the subsequent handshake request is in a registry (630). If the request is not found in the registry, the request can be recorded in the registry (635). The subsequent handshake request can be accepted and processed (640). If the request is found in the registry, the request can be left in the registry (645). The subsequent handshake request can be rejected (650).

Referring now to operation (605), and in some embodiments, a plurality of handshake requests can be received. For example, method 600 can include receiving, by a plurality of devices 510a-510n, a plurality of handshake requests to establish a respective transport layer security (TLS) connection 530 that include a respective application request. The plurality of handshake requests can include a first application request. In some embodiments, the handshake requests can include an application request, a TLS connection request, or both an application request and a TLS connection request. A client device 502 can transmit a handshake request to at least one of a plurality of devices 510a-510n. A plurality of client devices 502a-502n can transmit a plurality handshake requests to a plurality of devices 510a-

510n. In some embodiments, multiple client devices 502a-502n can transmit at least one handshake request to at least one device 510 of a plurality of devices. Each of the client devices 502a-502n can transmit one or more handshake requests to one or more devices 510a-510n of a plurality of devices 510a-510n.

The plurality of devices 510a-510n can be intermediary to a plurality of clients 502a-502n and a plurality of servers 520a-520n. For example, the devices 510a-510n can include intermediary devices disposed between one or more clients 502a-502n and one or more application servers 520a-520n. The devices 510a-510n can include servers, third party servers or TLS servers. For example, the devices 510a-510n can implement TLS protocol to provide communications security over a network 104. In some embodiments, the devices 510a-510n can implement TLS protocol to provide communications security over a network 104. The devices 510a-510n can establish a connection (e.g., application connection 532) between a client device 502 and an application server 520. The devices 510a-510n can establish a TLS connection 530 between a client device 502 and at least one of the devices 510a-510n.

The request 514 can include multiple requests for different devices or applications. For example, the request 514 can include a TLS connection request and an application request. The request 514 can include a first request to establish a TLS connection 530 with at least one device 510 of the plurality of devices 510a-510n. The request 514 can include a second request or first application request to establish a connection to at least one application server 520. The request 514 can identify at least one device 510 of the plurality of devices 510a-510n to establish a TLS connection 530 with the client device 502. In some embodiments, the request 514 can identify the device 510 that the request 514 is transmitted to or the device 510 that receives the request 514. The request 514 can identify at least one application server 520 of the plurality of application servers 520a-520n to establish an application connection 532 with the client device 502. In some embodiments, the request 514 can identify at least one application 522 hosted or provided by at least one application server 520a-520n of the plurality of application servers 520a-520n.

In some embodiments, a plurality of TLS connections 530a-530n can be established by the plurality of devices 510a-510n responsive to the plurality of handshakes requests 514a-514n. For example, a TLS connection 530 can be established responsive to each handshake request 514. The TLS connection 530 can be established between the client device 502 and at least one of the devices 510 of the plurality of devices 510a-510n for at least one handshake request 514 or for multiple handshake requests 514. In some embodiments, the client device 502 can establish multiple TLS connections 530a-530n with multiple different devices 510a-510n of the plurality of devices 510a-510n. The TLS connection 530 can be established between the client device 502 and the device 510 receiving the handshake request 514. In some embodiments, the TLS connection 530 can be established between the client device 502 and an owner device 510 that is identified to own or handle the respective handshake request 514. For example, the receiving device 510 can identify at least one other device 510 of the plurality of devices 510a-510n that is the owner device 510 or the device 510 to handle the respective handshake request 514 and can forward the respective handshake request 514 to the identified owner device 510. The identified owner device 510 can establish a TLS connection 530 to the client device 502 that transmitted the respective handshake request 514.

Referring now to operation (610), and in some embodiments, each of the plurality of handshake requests 514 can be recorded. For example, method 600 can include recording, by the plurality of devices 510a-510n, each of the respective application requests 514 to a registry 512 of application requests 514. The devices 510a-510n can maintain a registry 512 (e.g., request registry) for recording received requests 514a-514n. The devices 510a-510n can maintain a portion or subset of a registry 512 for recording received requests 514a-514n. For example, each of the devices 510a-510n of the plurality of devices 510a-510n can maintain a portion or subset of a main registry 512 for recording received requests 514a-514n. The subsets of the registry 512a-512n maintained at one or more of the devices 510a-510n can combine to form the main registry 512 having each of the recorded requests 514a-514n previously received by the plurality of devices 510a-510n. Thus, the main registry 512 can be spread out or partitioned into multiple subsets 512a-512n maintained at one or more of the devices 510a-510n of the plurality of devices 510a-510n. In some embodiments, the request registry 512 can be maintained at a remote or third party server that is separate from the plurality of devices 510a-510n. The devices 510a-510n can communicate with the request registry 512 to determine if a request 514 has been previously received and/or recorded. The devices 510a-510n can communicate with the request registry 512 to update or add a new entry responsive to receiving a new request 514 that has not been previously received and/or recorded.

In some embodiments, the devices 510a-510n can establish a subset of a registry 512. For example, a registry subset 512 can be established at each of the devices 510a-510n. The devices 510a-510n can establish a registry subset 512 responsive to receiving a first or initial request 514. In some embodiments, a device 510 can establish a registry subset 512 responsive to receiving a forwarded or transmitted request 514 from at least one other device 510 of the plurality of devices 510a-510n. The registry 512 or registry subset 512 can be generated as a database having a plurality of entries for recording received requests. For example, the registry 512 or registry subset 512 can be generated as a fixed-size data structure (e.g., counting Bloom filter) or a dynamic data structure.

The devices 510a-510n can forward or transmit a received request 514 to at least one different device 510 of the plurality of devices 510a-510n to record and store the received request 514. For example, the devices 510a-510n can spread out the requests 514 received from one or more clients 502a-502n amongst the plurality of devices 510a-510n to balance a plurality of requests 514 amongst the plurality of devices 510a-510n. The devices 510a-510n can spread out the requests 514a-514n received from one or more clients 502a-502n amongst the plurality of devices 510a-510n such that each device 510 handles, processes and/or records a similar number of requests 514a-514n. In some embodiments, an incoming or subsequent request 514 from a client device 502 can be routed to at least one device 510 of a plurality of devices 510a-510n. The device 510 receiving the request 514 can execute a mapping function to determine which device 510 is the owner device 510 for the request 514 and thus, responsible for recording the respective request 514. In an embodiment, the mapping function can be configured to distribute the requests 514a-514n equally or substantially equally across the plurality of devices 510a-510n such that an equal share or substantially equal share of requests 514a-514n can be mapped and/or recorded at a registry subset 512 at each of the devices 510a-510n. The mapping function can include a consistent hashing technique applied over a set of nodes corresponding to the plurality of devices 510a-510n to identify the next owner device 510 for a request 514. The received requests 514a-514n can be stored in registry subsets 512a-512n at the different devices 510a-510n based in part on a hashing technique or hashing algorithm. Each of the devices 510a-510n of the plurality of devices 510a-510n can be assigned a unique hash value using a hash function. Responsive to receiving a request 514, each of the devices 510a-510n can use the hash values to identify the appropriate owner device 510 to transit or forward the received request 514 to handle and/or record in the respective registry subset 512.

The registry subsets 512a-512n can include an entry for each received request 514a-514n. For example, the devices 510a-510n can record and/or store each received request in at least one entry of the corresponding registry subset maintained at the respective device 510. The devices 510a-510n can record and/or store each request 514 that the respective device 510 owns in at least one entry of the corresponding registry subset 512 maintained at the respective device 510. The entry for each request 514 can include a variety of different data corresponding to the request 514. For example, the entry for each request 514 can include, but not limited to, TLS connection request data, application request data (e.g., requested application, requested application server), an identifier and/or data corresponding to the client device that transmitted the request, time stamp data, encryption data, and/or hash codes. The devices 510a-510n can forward or transmit a received request 514 to a request registry 512 maintained at a remote server. The remote server can record and/or store each request 514 received at the plurality of devices 510a-510n in at least one entry of the corresponding registry 512 maintained at the remote server.

Referring now to operation (615), and in some embodiments, a subsequent handshake request 514 can be received. For example, method 600 can include receiving, by a first device 510 of the plurality of devices 510a-510n, a subsequent handshake request 514 to establish a subsequent TLS connection 530 that includes the first application request. A first device 510 of the plurality of devices 510a-510n can receive a handshake request 514. The handshake request 514 can be subsequent to a plurality of previously received handshake requests 514a-514n. In some embodiments, the handshake request 514 can be subsequent to a plurality of previously received handshake requests 514a-514n that have been recorded and/or stored at a registry 512 (e.g., request registry) or at one or more registry subsets 512a-512n maintained at one or more devices 510a-510n of the plurality of devices 510a-510n. For example, each of the plurality of devices 510a-510n can store and/or maintain a portion of a registry 512. In an embodiment, each of the plurality of devices 510a-510n can store and/or maintain a registry subset 512 that is a portion of the registry 512.

The subsequent handshake request 514 can include a TLS connection request and an application request. For example, the subsequent handshake request can include a request to establish a TLS connection 530 with at least one of the devices 510a-510n of the plurality of devices 510a-510n. The subsequent handshake request 514 can include a request for an application server 520 or an application 522 hosted or provided by at least one application server 520 of a plurality of application servers 520a-520n. In an embodiment, the subsequent handshake request 514 can include a first application request that identifies an application server 520, an application 522 hosted or provided by at least one application server 520 of a plurality of application servers 520a-520n, and/or a resource hosted or provided by at least one application server 520 of a plurality of application servers 520a-520n.

Referring now to operation (620), and in some embodiments, a device 510 to handle the subsequent handshake request 514 can be identified. For example, the method can include selecting, using a mapping function, for each of the plurality of handshake requests 514a-514n a device 510 from the plurality of devices 510a-510n for storing the respective application request 514 to the registry 512. In some embodiments, the device 510 receiving the subsequent handshake request 514 can perform a mapping function or execute a mapping algorithm to identify the appropriate owner device 510 of the subsequent handshake request 514 amongst the plurality of devices 510a-510n. The appropriate owner or owner device 510 as used herein can refer to the device 510 that records and/or stores a handshake request 514. Thus, the device 510 receiving the subsequent handshake request 514 can identify the owner device 510 for the subsequent handshake request 514 using the mapping function.

In some embodiments, the first device 510 can determine which of the plurality of devices 510a-510n is to store the first application request 514 in the registry 512 or in a registry subset 512. For example, the first device 510 can determine which of the plurality of devices 510a-510n is the owner device 510 for the subsequent handshake request 514 and which of the plurality of devices 510a-510n is the owner device 510 to store the first application request 514 in a registry subset 512 maintained at the owner device 510. In some embodiments, the device 510 receiving the subsequent handshake request 514 may be the owner or the device 510 to record the subsequent handshake request 514. For example, the device 510 can perform the mapping function and determine that the device 510 that initially received the subsequent handshake request 514 is the owner device 510 for the subsequent handshake request 514.

In some embodiments, the device 510 receiving the subsequent handshake request 514 may not be the owner or the device 510 to record the subsequent handshake request 514. For example, the device 510 can perform the mapping function and determine that at least one other device 510 that is different from the device 510 that initially received the subsequent handshake request 514 is the owner device 510 for the subsequent handshake request 514. For example, a first device 510 can perform the mapping function and determine that a second device 510 of the plurality of devices 510a-510n that is different from the first device 510 is the owner device 510 for the subsequent handshake request 514.

Referring now to operation (625), and in some embodiments, the identified device 510 can be queried. In some embodiments, the first device 510 of the plurality of devices 510a-510n can query the identified owner device 510. The first device 510 (e.g., device that initially received the subsequent handshake request) can perform core-to-core and node-to-node messaging to communicate with the identified owner device 510. The query can include a message, transmission, or request from the first device 510 to the identified owner device 510 asking the owner device 510 if the owner device 510 has previously recorded and/or stored the subsequent handshake request 514. The query can include a message, transmission, or request from the first device 510 to the identified owner device 510 asking the owner device 510 if the owner device 510 has previously recorded and/or stored a handshake request 514 having similar codes, encryptions and/or data as the subsequent handshake request 514.

Referring now to operation (630), and in some embodiments, a determination can be made if the subsequent handshake request 514 is in a registry 512. For example, method 600 can include querying, by the first device 510 prior to accepting the first application request 510, the registry 512 for the first application request 514. The identified owner device 510 can determine if the subsequent handshake request 514 is in a registry subset 512 maintained at the identified owner device 510. For example, the identified owner device 510 can query or search the registry subset 512 it maintains for data corresponding to the subsequent handshake request 514. The data can include, but not limited to, codes, encryption codes, hash codes, client device identifies, TLS connection data, and/or application request data. In some embodiments, each received handshake request 514 can be given or otherwise include a unique identifier. The identified owner device 510 can query or search the registry subset 512 for the unique identifier corresponding to the subsequent handshake request 514.

For example, the identified owner device 510 can query or search a registry 512 maintained at a remote server, separate from the identified owner for data corresponding to the subsequent handshake request 514. In some embodiments, the identified owner device 510 can transmit a request 514 to the remote server to search for data corresponding to the subsequent handshake request 514. The remote server can perform a query or search and generate a response indicating whether or not the subsequent handshake request 514 has been previously recorded and/or stored. The identified owner device 510 can generate a response to the first device 510 indicating whether or not the subsequent handshake request 514 has been previously recorded and/or stored. In some embodiments, the response can indicate that the subsequent handshake request 514 and/or data corresponding to the subsequent handshake request 514 has been previously recorded and/or stored. For example, the response can indicate that the subsequent handshake request 514 or data corresponding to the subsequent handshake request 514 has been previously recorded and/or stored at the registry subset 512 of the identified owner device 510 or has been previously recorded and/or stored at the registry of a remote server. In some embodiments, the response can indicate that the subsequent handshake request 514 and/or data corresponding to the subsequent handshake request 514 has not been previously recorded and/or stored. For example, the response can indicate that no entry in the registry subset 512 of the identified owner device 510 or a registry of a remote server includes the subsequent handshake request 514 and/or data corresponding to the subsequent handshake request 514. The identified owner device 510 can transmit the response to the first device 510 or the device 510 of the plurality of devices 510a-510n that received (e.g., initially received) the subsequent handshake request 514.

Referring now to operation (635), and in some embodiments, if the request 514 is not found in the registry 512, the request 514 can be recorded in the registry 512. The first device 510 can receive a response or a message (e.g., core-to-core message, node-to-node message) from the identified owner device 510 indicating that the subsequent handshake request 514, application request 514 and/or data corresponding to the subsequent handshake request 514 is not included in an entry of the registry subset 512 maintained at the identified owner device 510. The first device 510 can forward the subsequent handshake request 514, the application request 514 and/or data corresponding to the subsequent handshake request 514 to the identified owner device 510. The first device 510 can transmit a message instructing or otherwise indicating to the identified owner device 510 to record and/or store the subsequent handshake request and/or data corresponding to the handshake request. The identified owner device 510 can record and/or store the subsequent handshake request 514, the application request 514, and/or data corresponding to the subsequent handshake request 514 in at least one entry of the registry subset 512 maintained at or by the identified owner device 510. In some embodiments, the identified owner device 510 can generate a new entry in the registry subset 512 to record the subsequent handshake request 514, the application request 514 and/or data corresponding to the subsequent handshake request 514. In some embodiments, the identified owner device 510 can update an existing entry in the registry subset 512 to record the subsequent handshake request 514, the application request 514, and/or data corresponding to the subsequent handshake request 514. In some embodiments, the identified owner device 510 can remove an existing entry in the registry subset 512 and add a new entry in the registry subset 512 to record the subsequent handshake request 514, the application request 514, and/or data corresponding to the subsequent handshake request 514.

In some embodiments, the recordation of the subsequent handshake request 514, the application request 514 (e.g., first application request), and/or data corresponding to the subsequent handshake request 514 can be maintained in the registry 512 or in a registry subset 512 for or within an expiration period. For example, the subsequent handshake request 514, the application request 514 (e.g., first application request), and/or data corresponding to the subsequent handshake request 514 can be assigned an expiration period value. In some embodiments, each device 510 of the plurality of devices 510a-510n can assign the expiration period value to recorded handshake requests 514, application requests 514, and/or data corresponding to handshake requests 514. For example, the owner device 510 can record the handshake request 514 and/or an application request 514 corresponding to the handshake request 514. The owner device 510 can keep or maintain the record of the handshake request 514 and/or an application request 514 in the registry subset 512 maintained at the owner device 510 for a predetermined time period or expiration period.

In some embodiments, to maintain a fixed sized registry or registry subset, the devices 510 can remove requests 514a-514n or entries that have been maintained in the respective registry 512 or registry subsets 512a-512n longer than the expiration period from the respective registry 512 or registry subsets 512a-512n. The clean-up of the registry 512 or registry subsets 512a-512n can be done periodically. For example, the clean-up of the registry 512 or registry subsets 512a-512n can be at set time periods or set time intervals. The removal of requests 514a-514n or entries can be performed to keep the registry 512 or registry subsets 512a-512n from filling up. For example, periodically, each device 510 can remove requests 514a-514n or entries from its respective registry 512 that are older than the expiration period. The expiration period can be configurable. In some embodiments, a replayed request 514 or request 514 that has been previously recorded and that arrives after the expiration period has elapsed for a copy that was stored in the registry 514 can be detected using the TLS protocol. The predetermined time period or expiration period can be a variety of different values. For example, the predetermined time period or expiration period can correspond to a time period selected for a particular code (e.g., encryption code, hash code) used for a handshake request 514 or application request 514. In some embodiments, the handshake request 514 or application request 514 can be assigned a predetermined time period or expiration period. The predetermined time period or expiration period can be established by an administrator.

Referring now to operation (640), and in some embodiments, the subsequent handshake request 514 can be accepted and processed. The first device 510 can generate a response to the client device 502 indicating that the subsequent handshake request 514 is accepted and processed. The first device 510 can establish an application connection 532 from the client device 502 to at least one application server 520 of the plurality of application servers 520a-520n. In some embodiments, the client device 502 can access at least one application 522 hosted or provided by at least one application server 520 of the plurality of application servers 520a-520n through the application connection 532.

Referring now to operation (645), and in some embodiments, if the request 514 is found in the registry 512, the request 514 can be left in the registry 512. For example, if the subsequent handshake request 514, the application request 514 and/or data corresponding to the subsequent handshake request 514 is already recorded and/or stored in at least one registry subset 512 or registry 512 this can indicate that the subsequent handshake request is a fraudulent request. The first device 510 can receive a response or a message (e.g., core-to-core message, node-to-node message) from the identified owner device 510 indicating that the subsequent handshake request 514, the application request 514 and/or data corresponding to the subsequent handshake request 514 is included at least one entry of the registry subset 512 maintained at the identified owner device 510. The first device 510 can generate a message to the identified owner device 510 instructing or otherwise indicating to the identified owner device 510 not to record or store the subsequent handshake request 514, the application request 514 and/or data corresponding to the subsequent handshake request 514. The identified owner device 510 can delete or remove the subsequent handshake request 514, the application request 514 and/or data corresponding to the subsequent handshake request 514.

Referring now to operation (650), and in some embodiments, the subsequent handshake request 514 can be rejected. The first device 510 can determine to reject the first application request 514 responsive to identifying from the query that the first application request 514 has been recorded in the registry 512. For example, the first device 510 can reject the application request 514 and/or handshake request 514 as a replay attack. The subsequent handshake request 514, the application request 514 and/or data corresponding to the subsequent handshake request 514 being stored in at least one registry 512 or registry subset 512 can indicate that this subsequent handshake request 514 and/or application request 514 may correspond to a replay attack. Thus, the first device 510 can generate a response to the client device 510 indicating that the subsequent handshake request 514 and/or the application request 514 is denied or otherwise rejected.

In some embodiments, the first device 510 can drop or reject part of the subsequent handshake request 514 and accept part of the subsequent handshake request 514. For example, the first device 510 can drop or reject the application request 514 responsive to the determination but accept a TLS connection request included in the subsequent handshake request 514. The first device 510 can reject the request to connect to an application server 520 or an application 522 hosted by an application server 520 responsive to determining that the subsequent handshake request 514 has been previously recorded and accept the TLS connection request included in the subsequent handshake request 514. In some embodiments, the first device 510 can drop or reject the application request 514 responsive to the determination and reject the TLS connection request included in the subsequent handshake request 514.

In some embodiments, for each handshake request 514 or each subsequent handshake request 514, at least one device 510 of the plurality of devices 510a-510n can query, prior to accepting the handshake request 514 or an application request 514 included with the handshake request 514, an owner device 510, a registry 512 or registry subset 512 to determine if the handshake request 514 or an application request 514 included with the handshake request 514 has been previously recorded and/or stored in a registry 512 or registry subset 512. For example, a second device 510 of the plurality of devices 510a-510n can receive a second subsequent handshake request 514 to establish a second subsequent TLS connection that includes a second application request 514. The second device 510 can query, prior to accepting the second application request 514, the registry 512 or a registry subset 512 for the second application request 514. For example, the second device 510 can identify an owner device 510 of the plurality of devices 510a-510n for the second subsequent handshake request 514 and/or the second application request 514. The second device 510 can query the owner device 510 to determine if the second subsequent handshake request 514 or second application request 514 has been previously recorded. The owner device 510 can generate a response to the second device 514 indicating whether or not the second subsequent handshake request 514 and/or the second application request 514 has been previously recorded. In some embodiments, the second device 510 can be the owner device 510 of the second subsequent handshake request 514. The second device 510 can query or search the registry subset 512 maintained at the second device 510 to whether or not the second subsequent handshake request 514 and/or the second application request 514 has been previously recorded.

In some embodiments, for each handshake request 514 or each subsequent handshake request 514, at least one device 510 of the plurality of devices 510a-510n can determine to accept an application request 514 responsive to identifying from a query that the respective application request 514 or handshake request 514 has not been recorded in the registry 512, and can accept a TLS connection request included in the respective subsequent handshake request 514. For example, the second device 510 of the plurality of devices 510a-510n can accept a second application request 514 responsive to identifying from the query that the second application request 514 and/or second subsequent handshake request 514 has not been recorded in a registry 512 or registry subset 512. The second device 510 can accept a TLS connection request included in the second subsequent handshake request 514. For example, the second device 510 can establish a TLS connection between the client device 502 that transmitted the second application request 514 and/or second subsequent handshake request 514 and the second device 510.

In some embodiments, for each handshake request 514 or each subsequent handshake request 514, at least one device 510 of the plurality of devices 510a-510n can determine to reject an application request 514 responsive to identifying from a query that the respective application request 514 or handshake request 514 has been recorded in the registry 512 or registry subset 512, and can reject a TLS connection request included in the second subsequent handshake request 514. For example, the second device 510 of the plurality of devices 510a-510n can reject a second application request 514 responsive to identifying from the query that the second application request 514 and/or second subsequent handshake request 514 has been recorded in a registry 512 or registry subset 512. The second device 510 can reject a TLS connection request included in the second subsequent handshake request 514.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method comprising:
   receiving, by a computing device, a handshake request to establish a connection for an application request to access an application, wherein the connection is a transport layer security (TLS) connection;
   identifying, by the computing device prior to one of rejecting or accepting the handshake request to establish the TLS connection for the application request, that the application request of the handshake request is stored in a registry, the registry storing application requests received from handshake requests across a plurality of computing devices, wherein the handshake request of the application request is different from the handshake requests that provided the application requests stored in the registry;
   determining, by the computing device, prior to accepting the handshake request to establish the connection for the application request, to reject the application request of the handshake request responsive to identifying that the application request is stored in the registry; and
   accepting the handshake request to establish the connection and rejecting the application request.

2. The method of claim 1, wherein the plurality of computing devices is intermediary to a requestor of the application and the application.

3. The method of claim 1, wherein the plurality of computing devices record to the registry at least each respective application request of the handshake requests.

4. The method of claim 1, further comprising querying, by the computing device, the registry for the application request of the handshake request.

5. A system comprising:
   one or more processors, coupled to memory and configured to:
   receive a handshake request to establish a connection for an application request to access an application, wherein the connection is a transport layer security (TLS) connection;
   identify, prior to one of rejecting or accepting the handshake request to establish the connection for the application request, that the application request of the handshake request is stored in a registry, the registry storing application requests received from handshake requests across a plurality of computing devices, wherein the handshake request of the application request is different from the handshake requests that provided the application requests stored in the registry;
   determine, prior to accepting the handshake request to establish the connection for the application request, to reject the application request of the handshake request responsive to identifying that the application request is stored in the registry; and
   accept the handshake request to establish the connection and rejecting the application request.

6. The system of claim 5, wherein the plurality of computing devices is intermediary to a requestor of the application and the application.

7. The system of claim 5, wherein the plurality of computing devices record to the registry at least each respective application request of the handshake requests.

8. The system of claim 5, wherein the one or more processors are further configured to query the registry for the application request of the handshake request.

9. A non-transitory computer readable medium storing program instructions for causing one or more processors to:
   receive a handshake request to establish a connection for an application request to access an application, wherein the connection is a transport layer security (TLS) connection;
   identify, prior to one of rejecting or accepting the handshake request to establish the TLS connection for the application request, that the application request of the handshake request is stored in a registry, the registry storing application requests received from handshake requests across a plurality of computing devices, wherein the handshake request of the application request is different from the handshake requests that provided the application requests stored in the registry;
   determine, prior to accepting the handshake request to establish the connection for the application request, to reject the application request of the handshake request responsive to identifying that the application request is stored in the registry; and
   accept the handshake request to establish the connection and rejecting the application request.

10. The non-transitory computer readable medium of claim 9, wherein the program instructions further cause the one or more processors to query the registry for the application request of the handshake request.

11. The non-transitory computer readable medium of claim 9, wherein the plurality of computing devices record to the registry at least each respective application request of the handshake requests.

* * * * *